June 28, 1932.  B. C. VON PLATEN ET AL  1,864,562

REFRIGERATION

Filed Jan. 25, 1928  2 Sheets-Sheet 1

Fig. 1.

Fig. 2.

INVENTORS
Baltzar Carl von Platen
Carl Georg Munters
BY
their ATTORNEY

June 28, 1932. B. C. VON PLATEN ET AL 1,864,562
REFRIGERATION
Filed Jan. 25, 1928  2 Sheets-Sheet 2

INVENTORS
Baltzar Carl von Platen
Carl Georg Munters
BY
ATTORNEY

Patented June 28, 1932

1,864,562

UNITED STATES PATENT OFFICE

BALTZAR CARL VON PLATEN AND CARL GEORG MUNTERS, OF STOCKHOLM, SWEDEN, ASSIGNORS TO ELECTROLUX SERVEL CORPORATION, OF NEW YORK, N. Y., A CORPORATION OF DELAWARE

REFRIGERATION  REISSUED

Application filed January 25, 1928, Serial No. 249,357, and in Sweden February 1, 1927.

Figure 3:
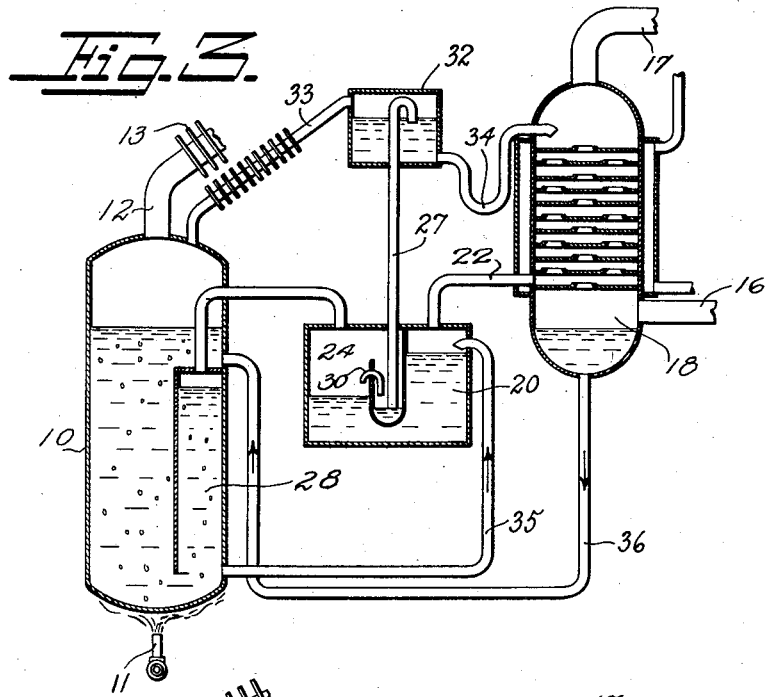
Figure 4:
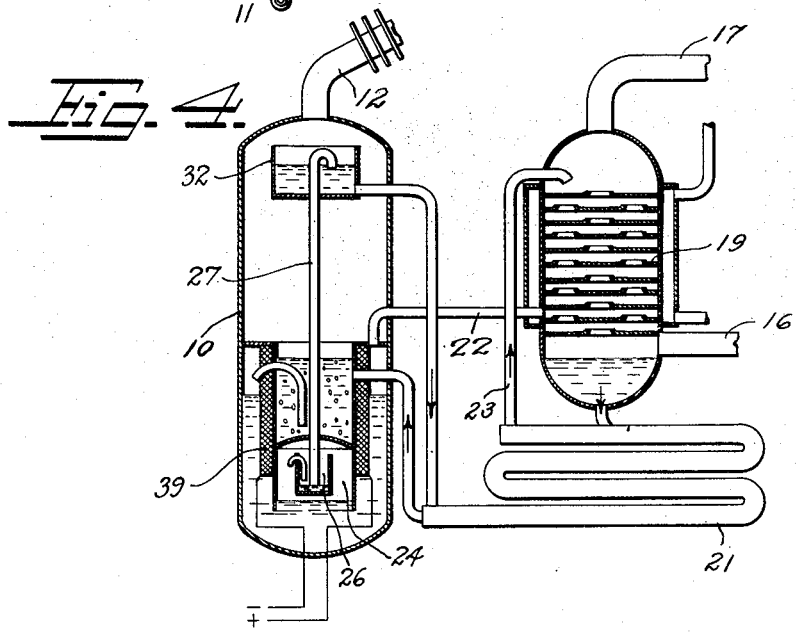

Our invention relates to means for circulating fluid in refrigerating systems of the absorption type and the nature of the invention, its novelty and its advantages will be apparent from the following description taken in connection with the accompanying drawings on which:

Fig. 1 shows a refrigerating system embodying one form of our invention;
Fig. 2 shows a modified form;
Fig. 3 shows still another form; and
Fig. 4 shows a fourth form.

Referring to Fig. 1 the refrigerating system comprises a generator 10 which is heated by a source of heat 11. The generator contains a cooling agent dissolved in absorption liquid. The cooling agent may be ammonia and the absorption liquid may be water. Ammonia vapor is driven out of absorption liquid in the generator and passes through conduit 12 and through rectifier 13 to condenser 14. In the condenser the ammonia is liquefied and passes into the evaporator 15 where it diffuses into an auxiliary agent such as hydrogen. Conduits 16 and 17 afford a circulation for the auxiliary agent between and through the evaporator 15 and the absorber 18. The evaporator and absorber contain disks 19 and may be made and operated as described in our Patent No. 1,609,334 of December 7, 1926.

Arranged outside the absorber is what we term an equalizer vessel 20. The term "equalizer vessel" is used because this vessel operates in conjunction with a periodical flow producing means to permit a constant level of liquid or a substantially constant level of liquid in the absorber. Vessel 20 is connected to the absorber by means of conduits 21 and 22. A part of conduit 21 is an outer conduit of a heat exchanger, the inner conduit 23 of which connects the lower part of the generator with the upper part of the absorber. Connected to vessel 20 is a pressure vessel 24. These vessels are connected at the bottom by a conduit 25 adapted to permit flow of liquid therethrough. Connected to the upper part of pressure vessel 24 is an overflow vessel 26. A riser pipe 27 projects downwardly into overflow vessel 26 and extends upwardly a considerable distance and has an upper opening inside the generator. Inside the generator is an auxiliary generator 28. The space surrounding auxiliary generator 28 may be considered as the main generator. A conduit 29 connects the upper part of the auxiliary generator 28 with the pressure vessel 24 and the connection is such, due to the open communication between vessels 24 and 26, that pressure generated in auxiliary generator 28 can be transmitted through conduit 29 to the inside of overflow vessel 26.

In operation

The apparatus in general operates as in our Patent No. 1,609,334 with the exception of the liquid circulation, wherefore the description of operation will be devoted to the liquid circulation cycle.

Assume that at a particular moment the lower opening of conduit 27 within vessel 26 is open so that a vapor generated in auxiliary generator 28 can pass through conduit 29 and through conduit 27 back to the generator. At this moment there is complete pressure equalization throughout the apparatus. Now assume that the liquid level in both vessels 20 and 24 rises. The liquid rises until the top point of siphon 30 is reached when a given amount of liquid is quickly transferred from chamber 24 into overflow vessel 26 and closes the lower opening of conduit 27. An excess of pressure is now generated in auxiliary generator 28 which acts through conduit 29 and acts against liquid in vessels 24 and 26. The result is a lowering of the levels in these chambers. The excess pressure is greater than the pressure in the generator proper and is counterbalanced by the difference of liquid level between the main generator and the auxiliary generator. The level falls until the upper end of the siphon 30 is uncovered. The liquid in overflow vessel 26 is now forced through conduit 27 by the excess pressure and into the generator. The excess of pressure causes a variation of liquid level in equalizer receptacle 20 but this does not cause a variation of level in the absorber due to the arrangement whereby the equalizer vessel is connected to the absorber to maintain the same vapor pressure and as conduit 21 is arranged to discharge into vessel 20 as indicated. The rise of pressure in the vessel 24 is balanced by the difference in liquid levels in vessels 24 and 20. Weak absorption liquid flows through conduit 23 from the bottom of the generator to the top of the absorber. When the liquid in overflow vessel 26 has been forced down and into conduit 27 so that the lower end of conduit 27 is uncovered, the liquid held in conduit 27 is discharged into the generator and equalization of pressure again takes place. The amount of liquid which is circulated can be regulated by properly dimensioning the proper vessels.

Fig. 2 differs from Fig. 1 in that equalizer vessels 20 is connected directly to the absorber so that conduits 21 and 22 of Fig. 1 are unnecessary. An overflow over the edge of vessel 20 takes the place of conduit 21. The operation will be substantially the same as in the arrangement of Fig. 1.

In Fig. 3 an arrangement is shown wherein the liquid lifted through conduit 27 is discharged into a vessel 32 from which gas is conducted to the generator through conduit 33 and absorption liquid is conducted through conduit 34 to the absorber. The vessel 20 in this case receives weak liquid from the generator through conduit 35 and the strong liquid is conducted from the bottom of the absorber through conduit 36 to the upper part of the generator. The liquid level in the absorber and in the main generator is the same in this arrangement.

Fig. 4 shows an arrangement wherein the pressure vessel 24 and the overflow vessel 26 are both inside the generator. The generator is heated by means of an annular electric heat element 39. The heat element surrounds the vessel 24 so that this vessel as well as the generator is heated. The operation and the various parts of Fig. 4 will be readily understood from the previous description and particularly by reference to Fig. 3.

Having thus described our invention, what we claim is:

1. Absorption refrigerating apparatus comprising a generator, an absorber, an equalizer vessel, means affording communication between said absorber and said equalizer vessel arranged to permit a constant level of liquid in the absorber independently of variations of liquid level in the equalizer vessel, and means connected with the equalizer vessel for lifting liquid therefrom to above the level of liquid in the absorber and for conveying the liquid so lifted to the generator.

2. Absorption refrigerating apparatus comprising a generator, an absorber, means to generate an excess of gas pressure above the generator gas pressure, a pressure vessel, an equalizer vessel, a connection for flow of liquid between the pressure vessel and the equalizer vessel, an overflow vessel, means for relatively swiftly conducting liquid from the pressure vessel to the overflow vessel, means to impose the excess pressure generated on the contents of the overflow vessel, means for connecting the equalizer vessel and the absorber to permit variations of liquid level in the equalizer vessel while maintaining a substantially constant liquid level in the absorber and a riser pipe connected to the overflow vessel to carry liquid therefrom to a higher level than the liquid level of the absorber.

3. Absorption refrigerating apparatus comprising a generator, an absorber, means to generate an excess of gas pressure above the generator gas pressure, a pressure vessel, an equalizer vessel, a connection for flow of liquid between the pressure vessel and the equalizer vessel, an overflow vessel, means for relatively swiftly conducting liquid from the pressure vessel to the overflow vessel, means to impose the excess pressure generated on the contents of the overflow vessel, means for connecting the equalizer vessel and the absorber to permit variations of liquid level in the equalizer vessel while maintaining a substantially constant liquid level in the absorber, a riser pipe extending upwardly from within the overflow vessel and arranged to discharge into the generator and a conduit for conducting absorption liquid from the generator to the absorber.

4. Absorption refrigerating apparatus of the type wherein circulation of liquid is produced by periodic variation in pressure comprising a generator, an absorber, a pressure vessel connected between the absorber and the generator, an equalizer vessel connected between the absorber and the pressure vessel arranged to be supplied with liquid during rise of pressure during said variation of pressure and the parts being so connected that the said rise of pressure is produced in the pressure vessel and so that the rise of pressure is balanced by difference of liquid level in the pressure vessel and the equalizer vessel.

5. Absorption refrigerating apparatus comprising a generator, an absorber, means to generate an excess of gas pressure above the generator gas pressure, a pressure vessel, an equalizer vessel, a connection for flow of liquid between the pressure vessel and the equalizer vessel, an overflow vessel, a siphon for relatively swiftly conducting liquid from the pressure vessel to the overflow vessel, means to impose the gas pressure generated on the contents of the overflow vessel, means for connecting the equalizer vessel and the absorber to permit variations of liquid level in the equalizer vessel while maintaining a substantially constant liquid level in the absorber and a riser pipe connected to the overflow vessel to carry liquid therefrom to a higher level than the liquid level of the absorber.

In testimony whereof we hereunto affix our signatures.

BALTZAR CARL von PLATEN.
CARL GEORG MUNTERS.